United States Patent Office  3,573,195
Patented Mar. 30, 1971

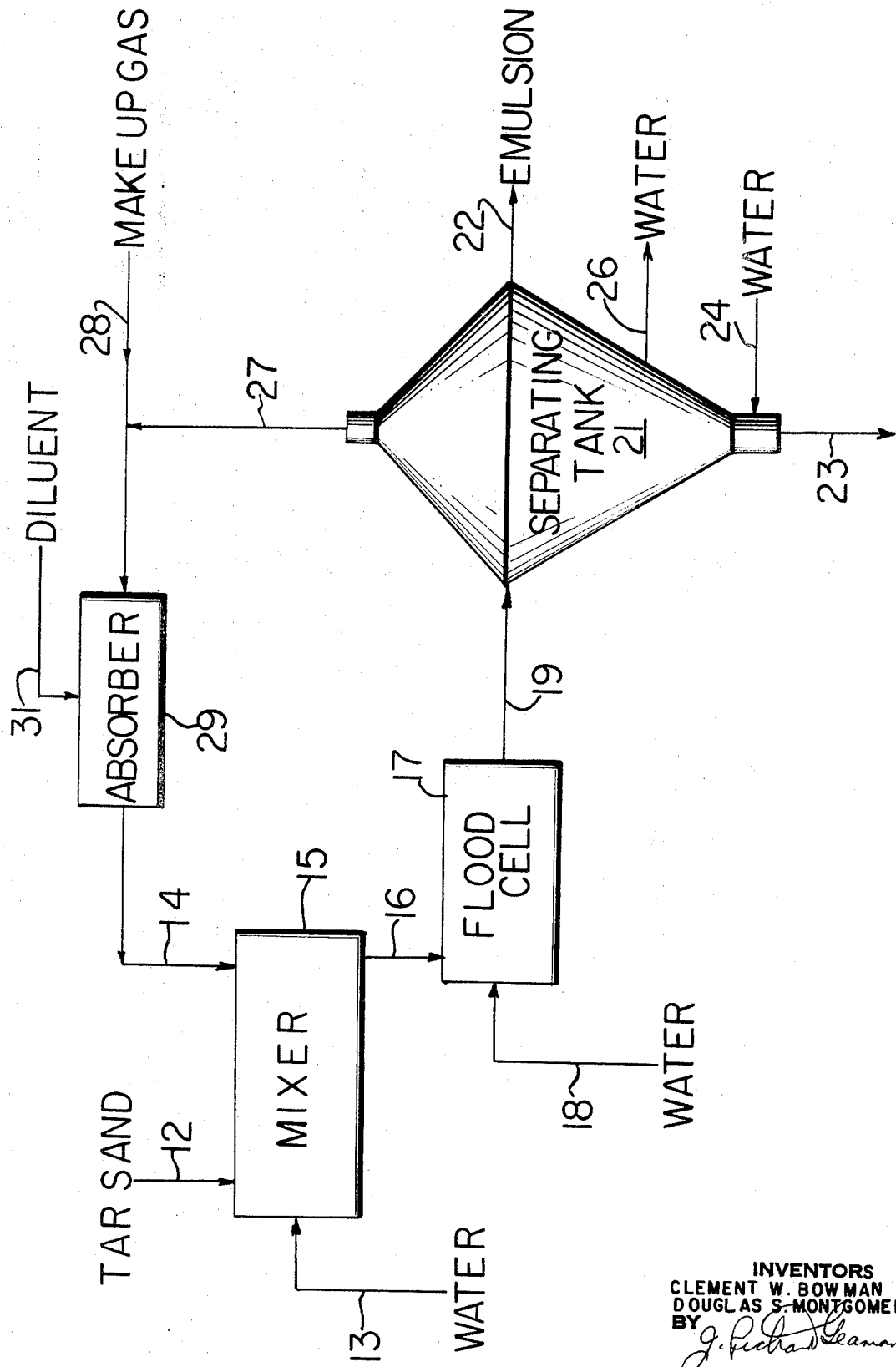

3,573,195
ADDITION OF LIGHT HYDROCARBON GAS TO TAR SAND
Clement W. Bowman, Edmonton, Alberta, and Douglas S. Montgomery, Ottawa, Ontario, Canada, assignors to Cities Service Athabasca, Inc., Imperial Oil Limited, Atlantic Richfield Corporation, and Royalite Oil Company, Limited, a fractional part interest to each
Filed Aug. 28, 1968, Ser. No. 755,974
Int. Cl. C07q 1/04
U.S. Cl. 208—11                                 7 Claims

ABSTRACT OF THE DISCLOSURE

Bitumen is recovered from bituminous sand by forming a fluid slurry of bituminous sand, water and liquid hydrocarbon diluent having normally gaseous hydrocarbon material dissolved therein at a temperature less than about 110° F., preferably between 80 and 110° F. The slurry is then introduced into a body of water maintained in a separation zone at a temperature greater than 150° F. usually between 150 and 200° F. so that the gaseous hydrocarbon comes out of the solution and aids in floatation of the bitumen to the top of the water while sand settles to the bottom for removal therefrom. Normally gaseous hydrocarbons including ethane, methane and propane may be used and are preferably used in amounts between about 0.5 and about 2.0 standard cubic feet of gas per standard cubic foot of bitumen. The liquid hydrocarbon diluent preferably boils between 200 and 500° F. and is used in amounts between about 1 and about 10 wt. percent based upon bitumen.

---

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 5% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling in a body of water, to recover an emulsion, or froth, which contains some of the fines and quantities of coarse sand. Such an emulsion or froth is referred to herein as a bituminous emulsion.

One well-known method for preparing such emulsions is often referred to as the "hot-water process." In the hot-water process, the bituminous sand is slurried with steam and hot water and the pulp is then agitated with a stream of circulating hot water and carried to a separation cell maintained at an elevated temperature of about 180° F. In the separation cell, entrained air causes the bitumen to rise to the top of the cell in the form of an emulsion containing air, bitumen, water and mineral solids. The mineral solids are extremely difficult to separate from the bitumen and, unless the emulsion is further treated, it will generally contain at least 5% of mineral solids. This bituminous emulsion or froth can be subjected to water washing to effect a partial reduction in solids.

A bituminous emulsion, such as that obtained by the abovedescribed procedures, often contains from about 10% to about 60% water, 5% to about 20% of mineral solids and from about 30% to about 85% bitumen. Usually, however, the bituminous emulsion or forth will contain, by weight, from about 25% to about 50% water, about 5% to about 12% mineral solids and about 35% to about 70% of bitumen.

Separation of water and mineral solids from the bituminous emulsion is necessary for most ultimate uses of the bitumen. A number of methods have been proposed for breaking bituminous emulsions and recovering the bitumen. One such method involves the use of thermal dehydration followed by cycloning as described in U.S. Patent 3,338,814 to R. A. Given et al.

The present invention contemplates the formation of a fluid slurry of bituminous sand containing liquid hydrocarbon diluent having dissolved therein normally gaseous hydrocarbon material, such as ethane, methane or propane. This slurry is then introduced into a separation zone containing a body of water maintained at a high enough temperature so that the normally gaseous hydrocarbon is evolved as a gas and aids in floatation of bitumen.

The accompanying drawing is a somewhat diagrammatic illustration of a suitable arrangement of apparatus for carrying out a preferred embodiment of the invention.

In practicing the present invention, the liquid hydrocarbon diluent containing dissolved normally gaseous hydrocarbons may be mixed with the slurry at any time prior to introduction of the slurry into the body of water in the separation zone for recovery of bitumen therefrom. The diluent containing dissolved hydrocarbon gases may conveniently be added to the bituminous sand during formation of the slurry or may be added to the slurry subsequent to its formation but prior to its introduction into the separation zone.

While liquid hydrocarbons may be used in whole or in part as the slurrying liquid in forming the slurry of bituminous sand, water is the preferred slurrying liquid and preferably comprises at least about 15 wt. percent of the slurry.

Normally gaseous hydrocarbons suitable for use in practicing the present invention include those hydrocarbons such as ethane, propane and methane which are gaseous under normal conditions, i.e. a pressure of one atmosphere and a temperature of 60° F. Among the various suitable hydrocarbon materials, methane is a prefererd hydrocarbon for this purpose.

Suitable liquid hydrocarbon diluents for the use in accordance with the invention include broadly any hydrocarbon which is liquid at the operating conditions employed in the process. Such materials include for instance, a broad range of hydrocarbon distillate materials including naphtha, gas oil, etc. Preferably, such diluents boil between about 200 and about 500° F. Materials boiling substantially below this range are generally unsuitable because the temperatures normally maintained in typical hot water processes of the type described above would be above their boiling points while materials boiling substantially above 500° F. are apt to be so viscous as to cause difficulty in handling or in absorbing appropriate amounts of normally gaseous hydrocarbons. Liquid hydrocarbon diluents are preferably employed in amounts between about 1 and about 10 percent by weight based upon the total amount of bitumen in the slurry.

The normally gaseous hydrocarbon material may be placed into solution in the liquid hydrocarbon diluent in any suitable manner such as by bubbling through the the diluent or by the use of pressure. Normally gaseous hydrocarbons are preferably dissolved in the liquid hydrocarbon diluent in amounts between about 0.5 and about 2.0 standard cubic feet of gas per standard cubic foot of bitumen in the slurry. The term "standard cubic foot" is intended to refer to a cubic foot of material as measured at a pressure of one atmosphere and a temperature of 60° F.

The slurry of bituminous sand, water and liquid hydrocarbon diluent containing dissolved normally gaseous hydrocarbons is maintained at relatively low temperatures, preferably between about 80 and 110° F. prior to its introduction into the body of water in the separation zone in order to maintain desired quantities of normally gaseous hydrocarbon dissolved in the slurry. The body of hot water in the separation zone, on the other hand, is maintained at relatively higher temperatures, such as above 150° F. and preferably between about 150° F. and about 200° F. Under these higher temperature conditions, the normally gaseous hydrocarbon is evolved from the slurry as a gas and aids in floatation of bitumen to the top of the body of water for recovery therefrom. The hydrocarbond diluent having a lower specific gravity than water, also floats to the surface and may be recovered with the bituminous froth.

The slurry containing bituminous sand, water and liquid hydrocarbon diluent having normally gaseous hydrocarbons dissolved therein formed as described above may vary widely in composition, but normally contains between about 5 and about 10 wt. percent bitumen, between about 40 and about 75 wt. percent solids, between 20 and about 50 wt. percent water, and between about .05 and about 1.0 wt. percent liquid hydrocarbon diluent containing dissolved normally gaseous hydrocarbons.

Referring to the drawing, bituminous sand entering through a conduit 12, water entering through a conduit 13 and hydrocarbon diluent containing dissolved normally gaseous hydrocarbons entering through a conduit 14 are mixed in a mixer 15 to form a slurry. The aqueous slurry thus formed may be passed from the mixer through a conduit 16 to a flood cell 17 in which additional flooding water entering as through a conduit 18 may be mixed with the slurry to increase the water content thereof if desired. From the flood cell 17, the flooded slurry is passed through a conduit 19 to a separating tank 21 containing a body of water into which the slurry is introduced. Bitumen rises to the top of the body of water in the separating tank 21 and may be removed from the upper portion thereof in the form of a bituminous emulsion as through a conduit 22 while sand settles to the bottom and may be removed as through a conduit 23. As is conventional in such processes, water may be introduced through a conduit 24 to wash sand prior to its removal and a side stream of water may be removed through a conduit 26 and may, if desired, be recycled to the mixing step or treated for recovery of bitumen or solids therefrom.

Prior to introduction into the separating tank 21, the slurry is maintained at a temperature between about 80 and about 110° F. while the body of water in the separating tank is maintained at a temperature between about 150 and about 100° F. Due to the higher temperature in the separating tank, the normally gaseous hydrocarbon material originally dissolved in the liquid hydrocarbon diluent introduced through the conduit 14 is evolved as gas within the separating tank and aids in flotation of bitumen. This gas may then be collected and removed from the separating tank as through a conduit 27 and recycled together with makeup gas introduced as through a conduit 28 to an absorber 29 where it absorbed into liquid hydrocarbon diluent introduced as through a conduit 41. The diluent containing absorbed normally gaseous hydrocarbon material may then be utilized in the process as described above.

Liquid hydrocarbon diluent rises together with the bitumen in the separating tank 21 and may be recovered through the conduit 22 along with the bituminous emulsion. This diluent may either be passed from the process as product along with the bitumen or may be recovered from the bitumen as by conventional fractionation and recycled to the absorber 29 for reuse in the process.

EXAMPLE

In this example, the equipment and process described above in reference to the drawing is used in the recovery of bitumen from tar sand originally containing 11.75 wt. percent bitumen, 3.40 wt. percent water and 84.85 wt. percent solids. This tar sand is mixed in the mixer 15 at the rate of 120 lbs. per hour with water and liquid hydrocarbon diluent. The liquid hydrocarbon diluent is naphtha having a boiling range between 200 and 400° F. and which has dissolved in its one standard cubic foot of methane per standard cubic foot of bitumen in the tar said. Sufficient water is mixed with the tar sand and diluent to form a slurry containing 48 wt. percent solids, 45 wt. percent water, 6.7 wt. percent bitumen and 0.3 wt. percent hydrocarbon diluent. The slurry is then passed to the flood cell 17 wherein additional water is added to raise the water content of the slurry to 60 wt. percent and the flooded slurry is then transported to the separation tank 21. During its formation and until introduction into the separation tank, the slurry is maintained at a temperature of about 110° F. while the body of water in the separation tank is maintained at a temperature of 160° F. thereby resulting release of methane gas within the separation tank. The methane and air entrained and dissolved in the slurry during its formation acts to float bitumen and liquid hydrocarbon diluent to the top of the body of water in the separation tank and a mixture containing 3 wt. percent diluent, 72 wt. percent bitumen, 5 wt. percent solids and 20 wt. percent water is withdrawn therefrom through the conduit 22. Methane is recovered from the separation tank through the conduit 27 and is recycled to the absorber 29 along with fresh makeup methane. In the absorber 29, methane is absorbed by the naphtha introduced through the conduit 31 so that the naphtha introduced into the mixer 15 through the conduit 14 contains 1 standard cubic foot of absorbed methane per standard cubic foot of bitumen in the tar sand introduced through the conduit 12. Sand tailings withdrawn through conduit 23 from the separation zone contains 75 wt. percent solids, 0.3 wt. percent bitumen and approximately 25 wt. percent water. Sufficient water is removed through conduit 26 to maintain a steady emulsion-water interface at the top of separating tank 21.

While the invention has been described above with respect to preferred embodiments thereof, it will be understood by those skilled in the art that various changes and modifications may be made without departing from the spirit and scope of the invention and it is intended to cover all such changes and modifications in the appended claims.

We claim:

1. A process for the recovery of bitumen from bituminous sand containing the same which comprises forming a fluid slurry of such bituminous sand, which slurry contains liquid hydrocarbon diluent having normally gaseous hydrocarbon material dissolved therein and is formed at a temperature below about 110° F., and then introducing such slurry into a body of water maintained at a temperature of at least about 150° F. so that bitumen, liquid hydrocarbon diluent and gaseous hydrocarbons float to the top of the body of water for recovery therefrom.

2. The process of claim 1 in which the normally gaseous hydrocarbon material dissolved in hydrocarbon diluent in the slurry is added in amounts between about 0.5 and about 2.0 standard cubic feet of normally gaseous hydrocarbon material per standard cubic foot of bitumen in the slurry.

3. The process of claim 2 in which the slurry is an aqueous slurry and the hydrocarbon diluent is added in amounts between about 1 and about 10 wt. percent based on bitumen in the slurry.

4. The process of claim 3 in which the liquid hydrocarbon diluent has a boiling range between about 200 and about 500° F.

5. The process of claim 4 in which the normally gaseous hydrocarbon material is methane.

6. The process of claim 1 in which the slurry containing liquid hydrocarbon diluent and dissolved normally gaseous hydrocarbons is maintained at a temperature between about 80 and 110° F. prior to its introduction into the body of water and in which the body of water is maintained at a temperature between about 150 and 200° F. whereby the normally gaseous hydrocarbon material is released from the solution as a gas upon introduction into the body of water.

7. The process of claim 3 in which the normally gaseous hydrocarbon material and hydrocarbon diluent are added to the slurry during the formation of the slurry.

References Cited
UNITED STATES PATENTS

| | | | |
|---|---|---|---|
| 2,965,557 | 12/1960 | Price | 208—11 |
| 3,050,289 | 8/1962 | Gerner | 208—11 |

CURTIS R. DAVIS, Primary Examiner